(12) United States Patent
Pein

(10) Patent No.: US 12,054,004 B2
(45) Date of Patent: Aug. 6, 2024

(54) MEASURING RIM FOR MEASURING THE BRAKE ABRASION OF A WHEEL BRAKE

(71) Applicant: AVL List GmbH, Graz (AT)

(72) Inventor: Andreas Pein, Paldau (AT)

(73) Assignee: AVL List GmbH, Graz (AT)

( * ) Notice: Subject to any disclaimer, the term of this patent is extended or adjusted under 35 U.S.C. 154(b) by 347 days.

(21) Appl. No.: 17/638,686

(22) PCT Filed: Aug. 28, 2020

(86) PCT No.: PCT/AT2020/060321
§ 371 (c)(1),
(2) Date: Feb. 25, 2022

(87) PCT Pub. No.: WO2021/035271
PCT Pub. Date: Mar. 4, 2021

(65) Prior Publication Data
US 2022/0402297 A1  Dec. 22, 2022

(30) Foreign Application Priority Data

Aug. 28, 2019 (AT) .............................. A 50746/2019

(51) Int. Cl.
B60B 21/12 (2006.01)
B60B 21/02 (2006.01)
(Continued)

(52) U.S. Cl.
CPC .............. B60B 21/12 (2013.01); B60B 21/02 (2013.01); F16D 65/0031 (2013.01);
(Continued)

(58) Field of Classification Search
CPC .................... B60B 21/12; B60B 21/02; G01N 2001/2223; G01N 1/22; G01N 15/00; B60T 17/22; G01M 17/013; F16D 65/0031
See application file for complete search history.

(56) References Cited

U.S. PATENT DOCUMENTS 4,205,412 A * 6/1980 Weber .................... B01D 50/60
15/345
4,670,062 A * 6/1987 Lester .................... B60S 3/042
15/345
(Continued)

FOREIGN PATENT DOCUMENTS

CN 106274878 A 1/2017
CN 108061116 A 5/2018
(Continued)

OTHER PUBLICATIONS

China National Intellectual Property Administration; Examination Report issued in counterpart application CN 202080060652.8; Date of Report Jun. 1, 2023.
(Continued)

Primary Examiner — Francis C Gray
(74) Attorney, Agent, or Firm — Dykema Gossett PLLC

(57) ABSTRACT

Various embodiments of the present disclosure are directed to measuring rims and methods for measuring a brake abrasion of a wheel brake having a measuring rim. In one embodiment, consistent with the present disclosure, a measuring rim is disclosed including a circumferential tire support surface connected on one side to an end wall and on an opposite side to a seal to form an outwardly closed inner space, and a rotary feed-through provided on a central region of the end wall, the rotary feed-through configured to supply a gaseous medium to the inner space of the measuring rim and remove it therefrom.

20 Claims, 3 Drawing Sheets

(51) Int. Cl.
  *F16D 65/00* (2006.01)
  *F16D 66/00* (2006.01)
  *G01N 1/24* (2006.01)
  *G01N 15/02* (2006.01)
  *G01N 15/06* (2006.01)

(52) U.S. Cl.
  CPC ............... *F16D 66/00* (2013.01); *G01N 1/24* (2013.01); *B60B 2900/70* (2013.01); *F16D 2066/001* (2013.01); *G01N 15/02* (2013.01); *G01N 15/06* (2013.01)

(56) References Cited

U.S. PATENT DOCUMENTS

| | | | | |
|---|---|---|---|---|
| 8,025,132 | B2 * | 9/2011 | Krantz | B60L 15/2036 55/385.3 |
| 8,167,098 | B2 * | 5/2012 | Jessberger | B60T 5/00 188/264 R |
| 10,072,716 | B2 * | 9/2018 | Metayer | F16D 55/22 |
| 2008/0029357 | A1 | 2/2008 | Krantz | |
| 2009/0265880 | A1 | 10/2009 | Jessberger | |
| 2010/0065387 | A1 * | 3/2010 | Tsiberidis | F16D 65/0031 188/218 A |
| 2013/0105252 | A1 * | 5/2013 | Pahle | F16D 65/0031 188/71.1 |
| 2020/0150016 | A1 | 5/2020 | Logovyy et al. | |

FOREIGN PATENT DOCUMENTS

| | | | | |
|---|---|---|---|---|
| CN | 109774697 | A | | 5/2019 |
| CN | 208902528 | U | | 5/2019 |
| DE | 202007000246 | U1 | | 8/2008 |
| DE | 202008009177 | U1 | | 11/2009 |
| DE | 102017200941 | A1 | | 7/2018 |
| DE | 102017006349 | A1 | | 1/2019 |
| DE | 102017200941 | B4 | * | 5/2019 ............. B60T 17/22 |
| DE | 102017006349 | B4 | * | 2/2022 ............. B60T 17/22 |
| FR | 1383257 | A | | 12/1964 |
| JP | 2008196684 | A | | 8/2008 |
| WO | 2008052805 | A1 | | 5/2008 |
| WO | 2017097901 | A1 | | 6/2017 |
| WO | 2018202421 | A1 | | 11/2018 |

OTHER PUBLICATIONS

Kukutschova J., et al., "On airborne nano/micro-sized wear particles released from low-metallic automotive brakes," Environmental Pollution, vol. 159 (Nov. 19, 2010), pp. 998-1006. Journal Artikel. Elsevier. XP028361882. doi: 10.1016/i.envpol.2010.11.036.

Grigoratos T., Martini G., "Brake wear particle emissions: a review." In: Environ. Sci. Pollut. Res., vol. 22, (Oct. 17, 2014), pp. 2491-2504. Review Artikel, Springer. doi: 10.1007/s11356-014-3696-8.

Akihiro Iijima et al., "Emission factor for antimony in brake abrasion dusts as one of the major atmospheric antimony sources." In: Environmental Science & Technology. Apr. 1, 2008 ; 42(8), pp. 2937-2942. doi: 10.1021/es702137g.

* cited by examiner

MEASURING RIM FOR MEASURING THE BRAKE ABRASION OF A WHEEL BRAKE

CROSS-REFERENCE TO RELATED APPLICATIONS

This application is a national stage filing based upon International PCT Application No. PCT/AT2020/060321, filed 28 Aug. 2020, which claims the benefit of priority to Austria application No. A 50746/2019, filed 28 Aug. 2019.

BACKGROUND

The present invention relates to a measuring rim for measuring the brake abrasion of a wheel brake, as well as to a method and to a measuring arrangement for measuring the brake abrasion using such a measuring rim.

The environmental pollution caused by particulate matter from vehicles has been known for a long time and is subject to ever stricter legal regulations. So far, the focus has mainly been on the particulate matter pollution which is generated by the combustion process in an internal combustion engine and released into the environment via the exhaust gases. In the meantime, however, other sources of particulate matter in a vehicle have also been identified. In particular, the brake system of a vehicle has come into focus in this case. The abrasion of the brake disk and the brake pads during the operation of the vehicle produces particulate matter which gets into the environment and is partly responsible for the particulate matter pollution in the air. The manufacturers of vehicles or brake systems are therefore increasingly focusing on reducing the generation of particulate matter by the brake system. In order to develop a brake system, brake test stands, on which the brake system is set up and subjected to dynamic tests, are often used. In order to be able to better assess the origin and the extent of particulate matter generation due to abrasion of the brake disk/brake pads, expanding such brake test stands in order to be able to measure the brake abrasion is already known. An example of this is WO 2017/097901 A1. This has also already been addressed in specialist literature, for example in Kukutschová J., et al., "On airborne nano/micro-sized wear particles released from low-metallic automotive brakes," Environmental Pollution 159 (2011), pp. 998-1006. The brake disk and the brake pad are substantially housed on the brake test stand and the air in the housing is sucked out and analyzed.

However, a brake test stand can only approximate real use in a vehicle on the road. For more realistic assessments, it is therefore always interesting to carry out measurements on the real vehicle while it is in operation on the road. For example, DE 10 2017 006 349 A1 shows an apparatus for measuring and classifying the particle emissions of a wheel brake of a vehicle during real operation on the road, whereas this apparatus could also be used on a brake test stand. Here, the brake having the brake disk and the brake shoes on the vehicle are enclosed in a housing.

Air is supplied into the housing and the particle-laden air is removed from the housing and supplied to a measuring system. The difficulty here is that a separate housing has to be produced for each vehicle, each wheel and each brake. In order to be able to accommodate the housing in the wheel case, it may be necessary to lengthen the wheel axle. Apart from that, the supply air and exhaust air must be guided in the wheel case, in which there is already little space and which is difficult to access. The underbody of the vehicle is often drilled through in order to be able to guide the supply air and exhaust air to the brakes. This apparatus is therefore expensive to use in practice.

DE 10 2017 200 941 B4 describes an apparatus for measuring brake particle emissions, in which apparatus a dust collecting funnel is attached to the outer ring of the wheel rim and rotates with the rim. Particle-laden air is sucked out via the dust collecting funnel and supplied to a particle measurement. However, the wheel rim is not sealed on the inside of the rim, which means that it is not possible to separate the brake abrasion from the tire or road abrasion or ambient dust in the particle-laden exhaust air. This prevents reliable quantification and classification of brake abrasion. Apart from that, in this apparatus, the flow conditions change with the geometric shape of the measured wheel rim, which is why a comparison of the brake abrasion between different vehicles or wheel rims is hardly possible.

The object of the present invention is that of making a reliable quantification and classification of the brake abrasion of a brake system of a vehicle possible and at the same time of reducing the effort in practical use.

SUMMARY OF THE INVENTION

This object is achieved by way of a measuring rim according to the invention which has a circumferential tire support surface, said tire support surface is connected on one side to an end wall and on the opposite side to a seal to form an outwardly closed inner space, wherein a rotary feed-through is provided on a central region of the end wall, via which rotary feed-through a gaseous medium can be supplied into and removed from the inner space of the measuring rim. Due to this configuration of a measuring rim, the inner space of the measuring rim is sealed off from the exterior so that cross-contamination with particles outside the measuring rim cannot occur, which improves the reliability and reproducibility of the measurement of the brake abrasion. As the gaseous medium is guided in the measuring rim, the flow conditions in the measuring rim, in particular the flow guidance, can be optimized and are not dependent on the numerous different geometries of conventional rims. The rotation of the measuring rim during operation can also be used to influence the flow conditions in a targeted manner, which also makes effective particle extraction possible. The extraction and transport efficiency of the brake abrasion particles can thus be improved. The extraction and transport efficiency is important in order to have as little particle loss as possible during the measurement. However, this also allows comparable measurements on different vehicles and brake systems because the efficiency of particle collection remains the same. Last but not least, measurements on the brake test stand can be compared with measurements on the roller test stand and measurements in real operation, which supports the development of brake systems or components thereof.

The use of the measuring rim can also be improved in comparison with the prior art because special attachments or covers are no longer required that would also have to be adapted to each rim. In addition, parts do not need to be accommodated in the confined wheel case and accessibility is simplified because all connections remain easily accessible from the outside. In addition, the measuring rim can be used in the vehicle as well as on a test stand, which increases flexibility in use.

A conical end wall which tapers in the direction of the central region improves the flow guidance within the measuring rim and facilitates the supply and removal of the gaseous medium.

If the rim wall of the measuring rim is designed as a hollow wall to form a first flow channel which extends from the rotary feed-through into the inner space of the measuring rim, the flow guidance within the measuring rim can be further improved. In particular, the flow of the supplied gaseous medium and of the removed gaseous medium can be better separated within the measuring rim. In this way, cross flows can be minimized. The same can be achieved by the rim wall of the measuring rim being designed as a double hollow wall to form a first flow channel and a second flow channel, and the first flow channel and the second flow channel each extending from the rotary feed-through into the inner space of the measuring rim.

If the first flow channel opens into the inner space of the measuring rim in the region of the seal, the formation of a dead volume in the region of the seal, which can negatively affect the measurement result, can be better prevented. For this purpose, it can be advantageous if a deflection plate which extends at least partly over the circumference is provided in the region of the seal. The flow in the region of the seal can be guided in a targeted manner by the deflection plate in order to be able to better prevent the formation of a dead volume.

In a possible embodiment, the second flow channel is designed having an inner wall which is adjacent to the inner space of the measuring rim and is at least partly perforated. Since the flow is directed radially outward anyway due to the rotation of the measuring rim, the arrangement of the removal on the radially inner wall is particularly advantageous. The spokes of the measuring rim can also be used for targeted flow guidance in the direction of the inner wall.

BRIEF DESCRIPTION OF THE DRAWINGS

In the following, the present invention is described in greater detail with reference to FIGS. 1 to 6 which show, by way of example, schematic and non-limiting advantageous embodiments of the invention. In the drawings.

DETAILED DESCRIPTION

Figure 1:
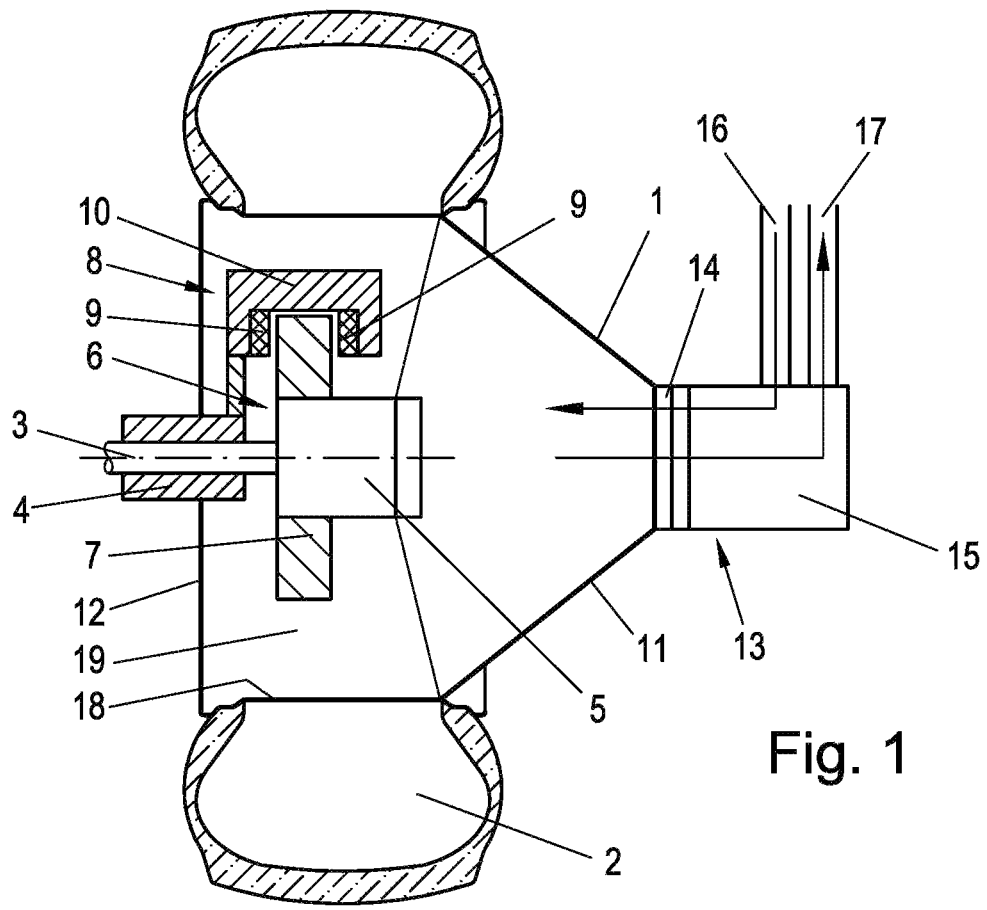
FIG. 1 shows an embodiment of a measuring rim according to the invention.

FIG. 1 shows a measuring rim 1 according to the invention, on which, if necessary, a tire 2 can be mounted in a conventional manner. When using the measuring rim 1 on a test stand, a tire 2 does not have to be mounted. In contrast, when using the measuring rim 1 on a vehicle which is operated on a road, a tire 2 will be required. The measuring rim 1 is attached to a wheel shaft 3 and rotates together with the wheel shaft 3 during operation. The measuring rim 1 can, for example, be attached in a conventional manner to a wheel hub 5 of a wheel shaft 3 of a drive train (or a part thereof) of a vehicle, for example by means of wheel bolts distributed over the circumference. The wheel hub 5 is connected to a wheel shaft 3 by means of which the wheel hub 5 is driven. The wheel shaft 3 is rotatably mounted in a vehicle on a component fixed to the vehicle, for example a wheel suspension 4. In the case of a wheel on a non-driven axle, the wheel hub 5 can also be rotatably mounted on a component fixed to the vehicle, for example a wheel suspension 4. For the invention, however, it does not matter whether the measuring rim 1 is used on a driven or non-driven axle. Attaching a rim to a drive train of a vehicle is well known, which is why it does not need to be discussed in more detail here. On a test stand, for example a brake test stand or drive train test stand, the wheel shaft 3 can also be mounted differently, in particular the wheel shaft 3, for example on a brake test stand, could also be the output shaft of an electric motor.

The wheel shaft 3 can be braked by means of a wheel brake 6 if necessary. For this purpose, a rotating brake part 7 of a wheel brake, for example a brake disk of a disk brake (as shown in FIG. 1) or a brake drum of a drum brake, can be arranged on the wheel hub 5 or directly on the wheel shaft 3. The rotating brake part 7 interacts when braking with a brake part 8 fixed on the vehicle, for example brake pads 9 on a floating caliper 10 (as in FIG. 1) or brake pads of a drum brake. For braking, a brake drive, which presses the movable brake pads 9 against the co-rotating brake part 7 or lifts said brake pads off said brake part, is provided in a sufficiently known manner. However, for reasons of clarity and because the brake drive is irrelevant to the invention, it is not shown. Of course, the brake can also be designed differently from a disk brake having a floating caliper or a drum brake.

In contrast to a conventional wheel rim, the measuring rim 1 is closed on the axially outer end face, i.e., facing away from the wheel brake 6, for example by means of an end wall 11. The end wall 11 is preferably designed to be conical, tapering axially outwardly (as shown in FIG. 1). Axially inwardly, in the region of the wheel shaft 3 or the wheel suspension 4, i.e., on the brake side, the measuring rim 1 is also closed, for example by means of a seal 12. The seal 12 can also be a rigid end wall, but can also be a flexible seal, for example in the form of a rubber bellows. The measuring rim 1 thus forms an axially outwardly and axially inwardly closed box. The measuring rim 1 is radially outwardly closed anyway by the tire support surface 18. To form a closed box, the tire support surface 18 connects the outer end wall 11 and the seal 12 over the circumference of the measuring rim 1.

A rotary feed-through 13 is arranged in the central region of the axially outer end wall 11. Such rotary feed-throughs 13 are well known and have a rotating part 14 which is connected to the end wall 11 of the measuring rim 1 that rotates during operation, for example by means of bolts distributed over the circumference. The rotating part 14 is connected to a stationary part 15 of the rotary feed-through 13. The rotary feed-through 13 forms flow channels in order to be able to transfer a medium from a stationary part (here media lines 16, 17) to a rotating part (here the measuring rim 1). A gaseous medium can be supplied to the measuring rim 1 via a supply line 16, for example a tube, and a gaseous medium can be removed from the measuring rim 1 via a removal line 17, for example a tube. The medium supplied is a particle-free gas, for example air, and the medium removed is a particle-laden gas, for example air laden with brake abrasion.

Figure 2:
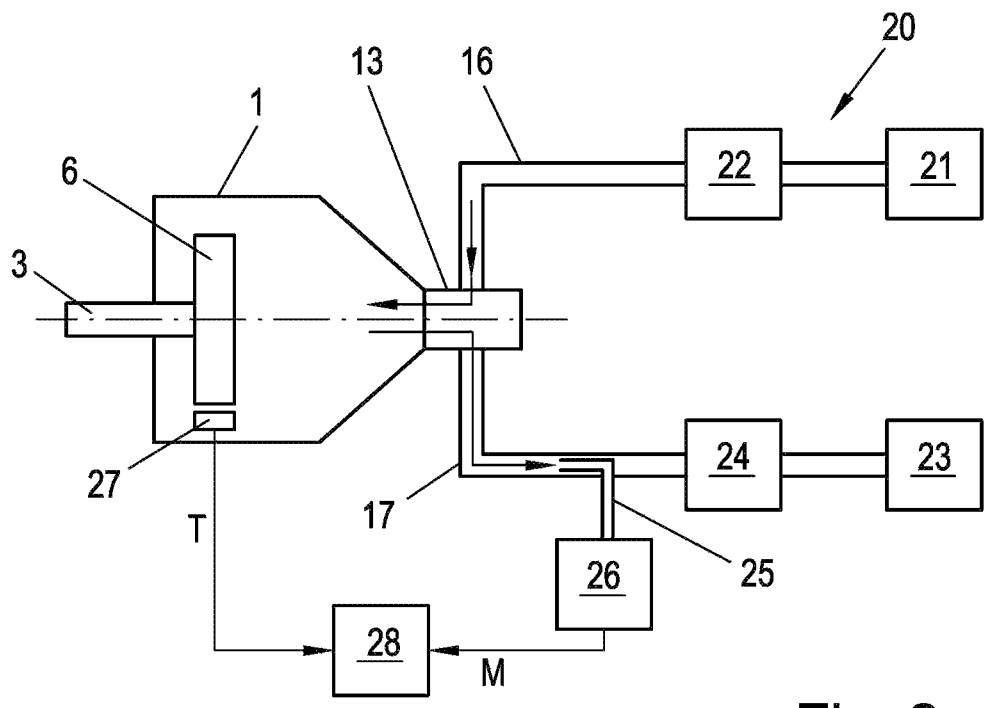
FIG. 2 shows a measuring arrangement having a measuring rim.

A possible measurement set-up is shown in FIG. 2. The measuring rim 1 together with the rotary feed-through 13 is attached, for example, to a vehicle or to a drive train on a test stand instead of a conventional rim. Air or another gas is supplied to the measuring rim 1 via the supply line 16, for example by means of a blower 21. In addition, a filter 22, for example a particulate filter such as a HEPA ("High Efficiency Particulate Air") filter, can also be arranged in the supply line 16 before the measuring rim 1 in order to remove dirt and dust particles in the supplied air. At the same time, air, or another supplied gas, is removed via the removal line 17. For this purpose, a suction pump 23 can also be provided on the removal line 17. A filter 24, for example a particulate filter such as a HEPA ("High Efficiency Particulate Air") filter, can be arranged upstream of the suction pump 23 or before the removed air is released into the environment in order to filter out the brake abrasion particles contained in the removed air. In principle, only the blower 21 or the suction pump 23 can be sufficient. When using both, the flow rates in the supply line 16 and the removal line 17 are advantageously supposed to be matched to one another in order to set the desired pressure conditions. Downstream of the measuring rim 1, but in any case upstream of any filter 24 that may be present, an extraction device 25 is provided in the removal line 17 in order to divert removed particle-laden gas in the removal line 17 from the removal line 17 and supply it to a measuring device 26. The extraction device 25 is, for example, an L-shaped tube which has an open end and is arranged in the removal line 17 against the direction of flow in the removal line 17. The measuring device 26 can also be provided with its own measuring pump and a flow control device in order to be able to set the amount of diverted gas. A flow measuring device can also be provided in the measuring device 26 or in the extraction device 25. The measuring device 26 determines a property of the brake abrasion, for example the amount or the mass of the brake abrasion particles in the removed gaseous medium, a distribution of the brake abrasion particles according to size or mass or determines other properties of the brake abrasion. For example, by means of the measuring device 26, the following measured quantities can be determined either integrally (over a defined cycle) or time-resolved, depending on the analytical question: particle mass, particle number, particle size distribution or particle composition of the brake abrasion. The measuring device 26 can also send the determined measured quantity M to an evaluation unit 28 (computer hardware and/or software) for evaluation. A temperature T of the measuring rim 1 or the wheel brake 6 can also be measured by means of a temperature sensor 27 and used in the evaluation unit 28 (or also in the measuring device 26) to correct the measured quantity M (as will be described in more detail below).

Figure 3:
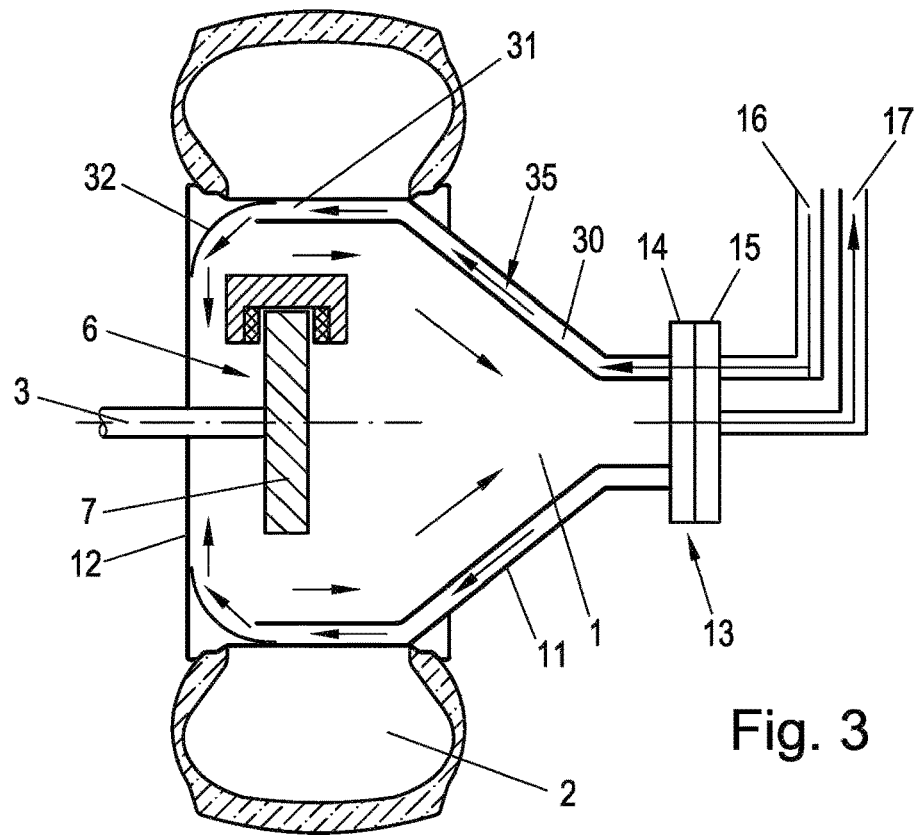
FIG. 3 shows an embodiment of a measuring rim having a hollow wall.

In an advantageous configuration of the measuring rim 1 according to FIG. 3, the rim wall of the measuring rim 1 is designed at least partly as a hollow wall to form a first flow channel 35. The first flow channel 35 extends along the rim wall from the rotary feed-through 13 to the inner space of the measuring rim 1. To form the first flow channel 35, the end wall 11 facing away from the wheel brake 6 can be designed as a hollow wall having a hollow space 30. Likewise, the tire support surface 18 can be designed at least partly as a hollow wall 31, the hollow spaces 30, 31 of the end wall 11 and the tire support surface 18 being connected to one another. The hollow spaces do not have to be continuous neither in the circumferential direction nor in the radial direction. For example, stiffening plates could be arranged in the hollow spaces 30, 31. This first flow channel 35 preferably opens into the inner space of the measuring rim 1 in the region of the seal 12. This can advantageously support the removal of brake abrasion particles behind the wheel brake 6 (i.e., on the side facing away from the removal of the gaseous medium).

In the region of the seal 12, i.e., at the brake-side axial end of the measuring rim 1, a deflection plate 32 can also be provided at least partly over the circumference in order to deflect the flow of the gaseous medium in a targeted manner from the axial direction into the radial direction. The flow is preferably deflected in such a way that it flows radially inwardly along the seal 12, i.e., between the seal 12 and the wheel brake 6. This can also help to avoid the formation of a dead volume behind the wheel brake 6.

In the embodiment according to FIG. 3, the supplied gaseous medium or also the removed particle-laden gaseous medium can be conducted in the first flow channel 35 (as in FIG. 3). In the first case, the gaseous medium loaded with brake abrasion particles is removed in the radially central region and in the second case the gaseous medium is supplied in the radially central region of the end wall 11.

Flow guide elements 33 can also be arranged in the inner space of the measuring rim 1 in order to guide in a targeted manner and/or to improve the flow of both the supplied gaseous medium and the removed gaseous medium which forms in the inner space. Such flow guide elements 33 can be arranged on the end wall 11, the seal 12 and/or in the region of the tire support surface 18. The spokes 19 of the measuring rim 1 can also be used for influencing the flow and flow conditions in the inner space of the measuring rim 1 in a targeted manner.

Figure 4:
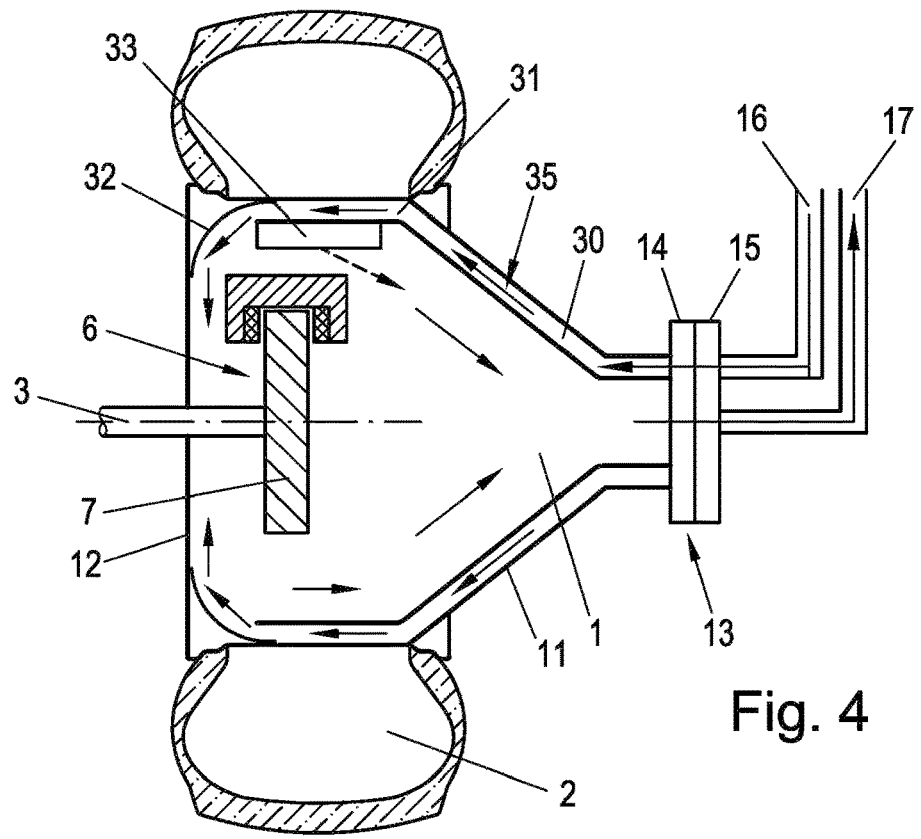
FIG. 4 shows an embodiment of a measuring rim having flow guide elements in the region of the tire support surface.

In the embodiment according to FIG. 4, flow guide elements 33 are arranged on the radially inner rim wall so as to be distributed over the circumference of the measuring rim 1 in the region of the tire support surface 18. Said elements are designed to support the flow of the gaseous medium in the direction of the central region at the end wall 11 (when the gaseous medium is removed at the central region) when the measuring rim 1 rotates or to support the flow of the gaseous medium in the direction of the seal 12 (when the gaseous medium is supplied at the central region) when the measuring rim 1 rotates. These flow guide elements 33 are independent of whether the rim wall is designed as a hollow wall (as in FIG. 3, 4 or 6) or not.

Figure 5:
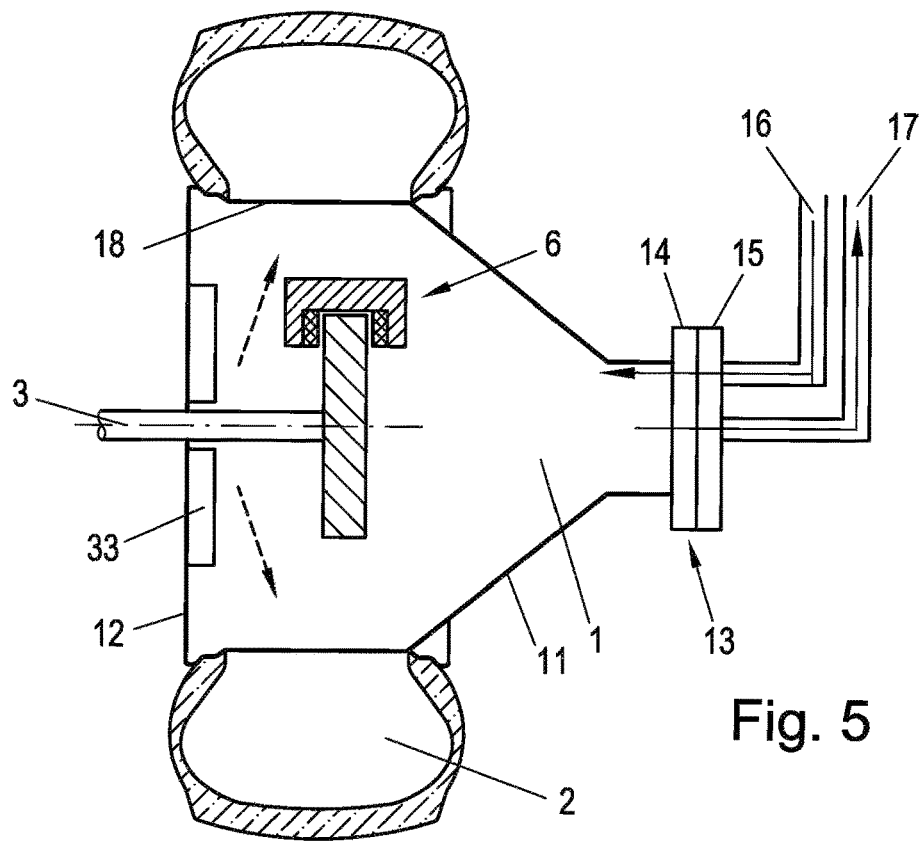
FIG. 5 shows an embodiment of a measuring rim having flow guide elements in the region of the seal and FIG. 6 shows an embodiment of a measuring rim having a double hollow wall.

In the embodiment according to FIG. 5, flow guide elements 33 are arranged on the seal 12 so as to be distributed over the circumference. Said elements are designed to generate a flow from radially inside to radially outside in the direction of the rim wall (indicated by the arrow), or vice versa. This can also advantageously support the removal of brake abrasion particles behind the wheel brake 6 (i.e., on the side facing away from the removal of the gaseous medium). These flow guide elements 33 are independent of whether the rim wall is designed as a hollow wall (as in FIG. 3, 4 or 6) or not.

Figure 6:
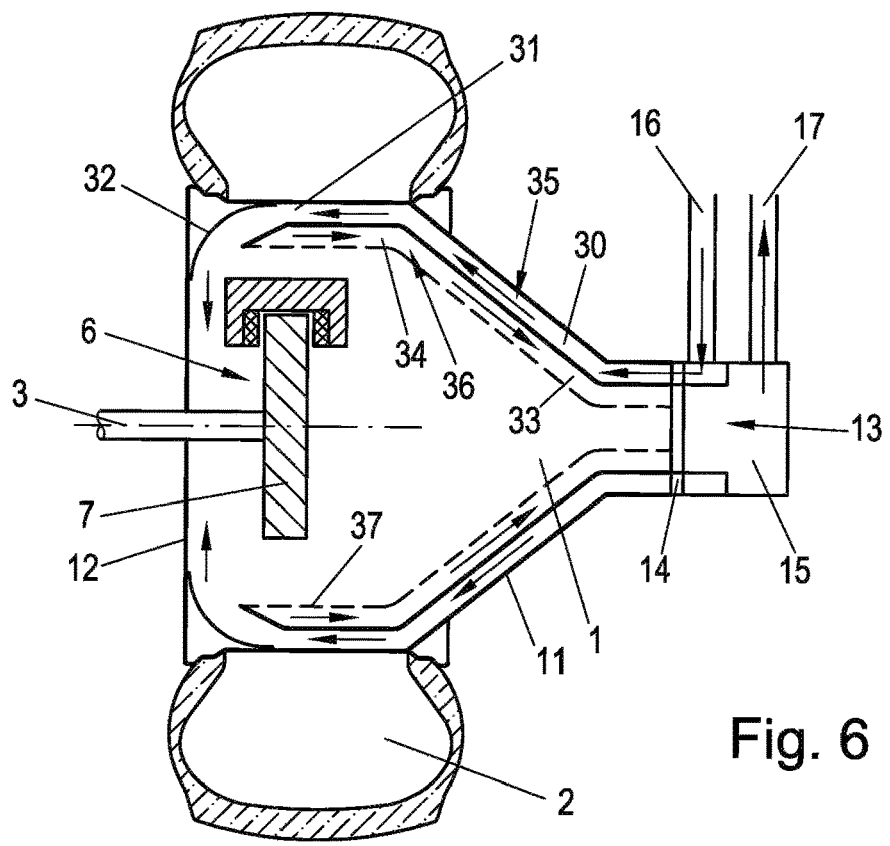

In a further advantageous embodiment, the rim wall is at least partly designed as a double hollow wall in order to form a first flow channel 35 (as in FIG. 3 or 4) and a second flow channel 36, as will be described with reference to FIG. 6. The second flow channel 36 also extends along the rim wall from the rotary feed-through 13 to the inner space of the measuring rim 1. The first flow channel 35 and the second flow channel 36 are at least partly arranged radially next to one another. On the measuring rim 1, first hollow spaces 30, 31 can be provided on the end wall 11 and the tire support surface 18, as described for FIG. 3. Second hollow spaces 33, 34 can be arranged radially inwardly to form the double hollow wall. The second hollow spaces 33, 34 of the end wall 11 and the tire support surface 18 are connected to one another. The hollow spaces 33, 34 do not have to be continuous neither in the circumferential direction nor in the radial direction. For example, stiffening plates could be arranged in the hollow spaces 33, 34. The first, radially outer flow channel 35 opens into the inner space of the measuring rim 1 preferably in the region of the seal 12. The radial inner wall 37 of the second flow channel 36 that is adjacent to the inner space of the measuring rim 1 is at least partly perforated such that gaseous medium can flow through the inner wall 37. The first flow channel 35 and the second flow channel 36 are preferably not directly connected to one another, for example by the end of the second flow channel 36 being closed off in the inner space of the measuring rim. In this arrangement, gaseous medium can be supplied from the rotary feed-through 13 into the inner space of the measuring rim 1 via the radially outer first flow channel 35. The gaseous medium laden with brake abrasion particles flows through the perforated inner wall 37 into the second flow channel 36 and is guided along the rim wall to the rotary feed-through 13 and removed there via the removal line 17. The rotation of the measuring rim 1 supports the flow of the gaseous medium laden with brake abrasion particles radially outwardly in the direction of the inner wall 37. However, the reverse arrangement is also conceivable, namely supply via the second flow channel 36 and removal via the first flow channel 35. In the embodiment according to FIG. 6, flow guide elements 33 are also possible on the inner wall 37 (in the region of the tire support surface 18 and/or the end wall 11) and/or on the seal 12.

The temperature at the wheel brake 6 influences the particle emission in a known manner, and it applies here that higher temperatures usually lead to an increase in the emission of the number of particles. However, this does not necessarily have to also apply to the particle mass since brake abrasion particles are normally smaller at higher temperatures. Therefore, for the measurement of the particle emission, a temperature at the wheel brake 6 that is as unadulterated as possible compared to real use is advantageous during the measurement. Each type of housing of the wheel brake 6 naturally influences the flow conditions around the wheel brake 6 and as a result also the temperature. However, the housing is important for the measuring rim 1 according to the invention in order to be able to make a reasonable measurement at all. To mitigate this potential contradiction, a temperature measurement can be integrated into the measuring rim 1 at a suitable point, preferably in the region of the wheel brake 6, for example by arranging a suitable temperature sensor 27 as shown in FIG. 2. If the temperature is then also measured on the conventional, unmodified rim (preferably on the same axle), a temperature correction of the measured quantities M of the brake abrasion can be carried out from the resulting temperature difference by means of appropriate tests and calibration. To do this, it is necessary to determine the dependency of a certain measured quantity on the temperature (or the temperature difference) in appropriate tests. The functions resulting therefrom can then be used to calculate a correction factor which corrects the measured quantity M, measured on the measuring rim 1, to the normal temperature, measured on the unmodified rim.

Furthermore, it is also possible to keep the temperature difference between the measuring rim 1 and the unmodified vehicle rim to zero, for example by controlling the flow of the gaseous medium supplied to the measuring rim 1 in a targeted manner, as a result of which the removal of heat from the measuring rim 1 can also be influenced by the supplied gaseous medium and the removed gaseous medium. This would have the advantage that any differences in temperature do not have to be corrected afterwards.

The invention claimed is:

1. Measuring rim comprising:
   a circumferential tire support surface connected on one side to an end wall and on an opposite side to a seal to form an outwardly closed inner space, and
   a rotary feed-through provided on a central region of the end wall, the rotary feed-through configured to supply a gaseous medium to the inner space of the measuring rim and remove it therefrom.

2. The measuring rim according to claim 1, characterized in that the end wall is conical, tapering in the direction of the central region.

3. The measuring rim according to claim 1, characterized in that a rim wall of the measuring rim is a hollow wall to form a first flow channel which extends from the rotary feed-through into the inner space of the measuring rim.

4. The measuring rim according to claim 1, characterized in that a rim wall of the measuring rim is designed as a double hollow wall to form a first flow channel and a second flow channel, and the first flow channel and the second flow channel each extend from the rotary feed-through into the inner space of the measuring rim.

5. The measuring rim according to claim 3, characterized in that the first flow channel opens into the inner space of the measuring rim in the region of the seal.

6. The measuring rim according to claim 5, further including a deflection plate which extends at least partly over the circumference and is positioned is provided in the region of the seal.

7. The measuring rim according to claim 4, characterized in that the second flow channel includes an inner wall which is adjacent to the inner space of the measuring rim and which is at least partly perforated.

8. The measuring rim according to claim 1, further including a temperature sensor on the measuring rim.

9. Measuring arrangement for measuring the brake abrasion of a wheel brake, the measuring arrangement comprising:
   the measuring rim according to claim 1, wherein the measuring rim is attached to a wheel shaft,
   the wheel shaft configured to be braked by means of the wheel brake,
   wherein the seal is arranged on the brake side,
   wherein the rotary feed-through is connected to a supply line and configured to supply the gaseous medium to the measuring rim, and the rotary feed-through is further connected to a removal line configured to remove gaseous medium laden with brake abrasion particles, and
   an extraction device is arranged in the removal line and configured to divert gaseous medium from the removal line and to supply said medium to a measuring device, and
   the measuring device configured to measure a property of the brake abrasion.

10. The measuring arrangement according to claim 9, characterized in that a measured quantity (M) measured using the measuring device is corrected by a correction factor which is dependent on the temperature (T) of the measuring rim or the temperature (T) of a part of the wheel brake.

11. Method for measuring the brake abrasion of a wheel brake having a measuring rim having an outwardly closed inner space, the method including the following steps:

attaching the measuring rim to a wheel shaft which can be braked by means of the wheel brake, supplying gaseous medium into the inner space of the measuring rim via a rotary feed-through of the measuring rim by means of a supply line, removing gaseous medium laden with brake abrasion particles via the rotary feed-through by means of a removal line, diverting gaseous medium from the removal line by means of an extraction device downstream of the rotary feed-through and supplied to a measuring device, and measuring a property of the brake abrasion with the measuring devices based upon the diverted gaseous medium supplied.

12. The method according to claim 11, characterized in that a measured quantity (M) measured using the measuring device is corrected by a correction factor which is dependent on the temperature (T) of the measuring rim or the temperature (T) of a part of the wheel brake.

13. The measuring rim according to claim 9, characterized in that the end wall is conical, tapering in the direction of the central region.

14. The measuring rim according to claim 9, characterized in that a rim wall of the measuring rim is a hollow wall to form a first flow channel which extends from the rotary feed-through into the inner space of the measuring rim.

15. The measuring rim according to claim 9, characterized in that a rim wall of the measuring rim is a double hollow wall to form a first flow channel and a second flow channel, and the first flow channel and the second flow channel each extend from the rotary feed-through into the inner space of the measuring rim.

16. The measuring rim according to claim 14, characterized in that the first flow channel opens into the inner space of the measuring rim in the region of the seal.

17. The measuring rim according to claim 16, further including a deflection plate which extends at least partly over the circumference and is positioned in the region of the seal.

18. The measuring rim according to claim 15, characterized in that the second flow channel includes an inner wall which is adjacent to the inner space of the measuring rim and which is at least partly perforated.

19. The measuring rim according to claim 15, characterized in that the first flow channel opens into the inner space of the measuring rim in the region of the seal.

20. The measuring rim according to claim 4, characterized in that the first flow channel opens into the inner space of the measuring rim in the region of the seal.

* * * * *